Sept. 4, 1928.                                        1,683,554
                    R. D. KENYON
                POTATO BAKING DEVICE
              Filed Aug. 24, 1927         2 Sheets-Sheet 1
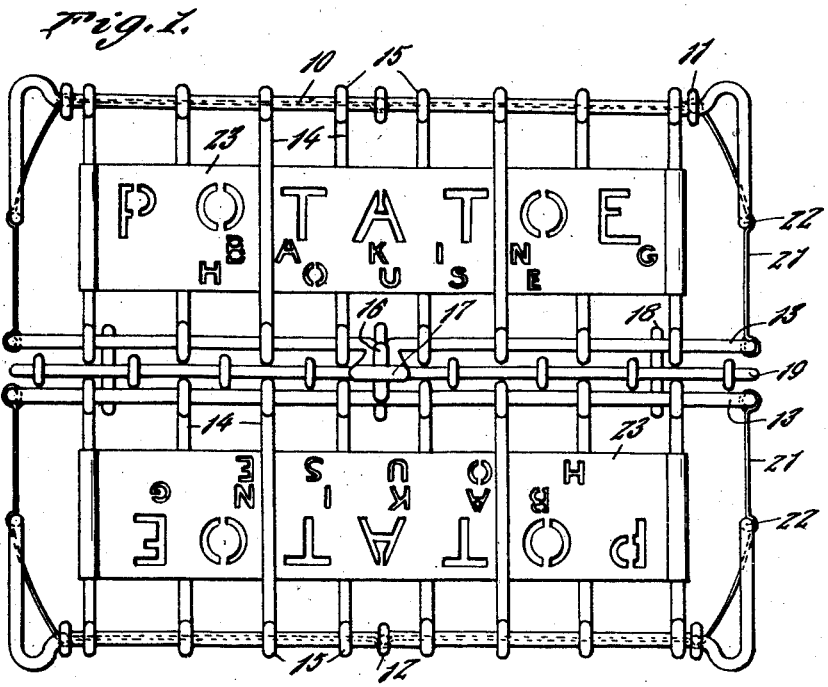
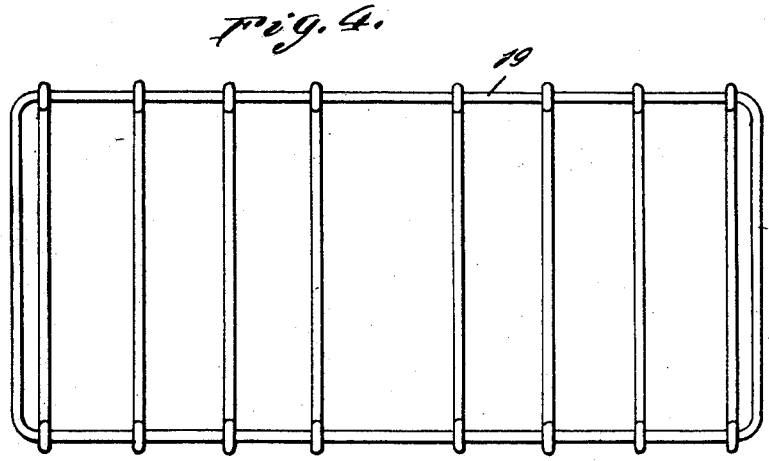
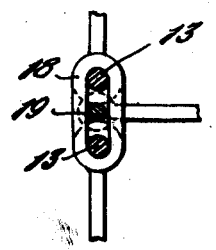
R. D. Kenyon
INVENTOR
BY Victor J. Evans
ATTORNEY

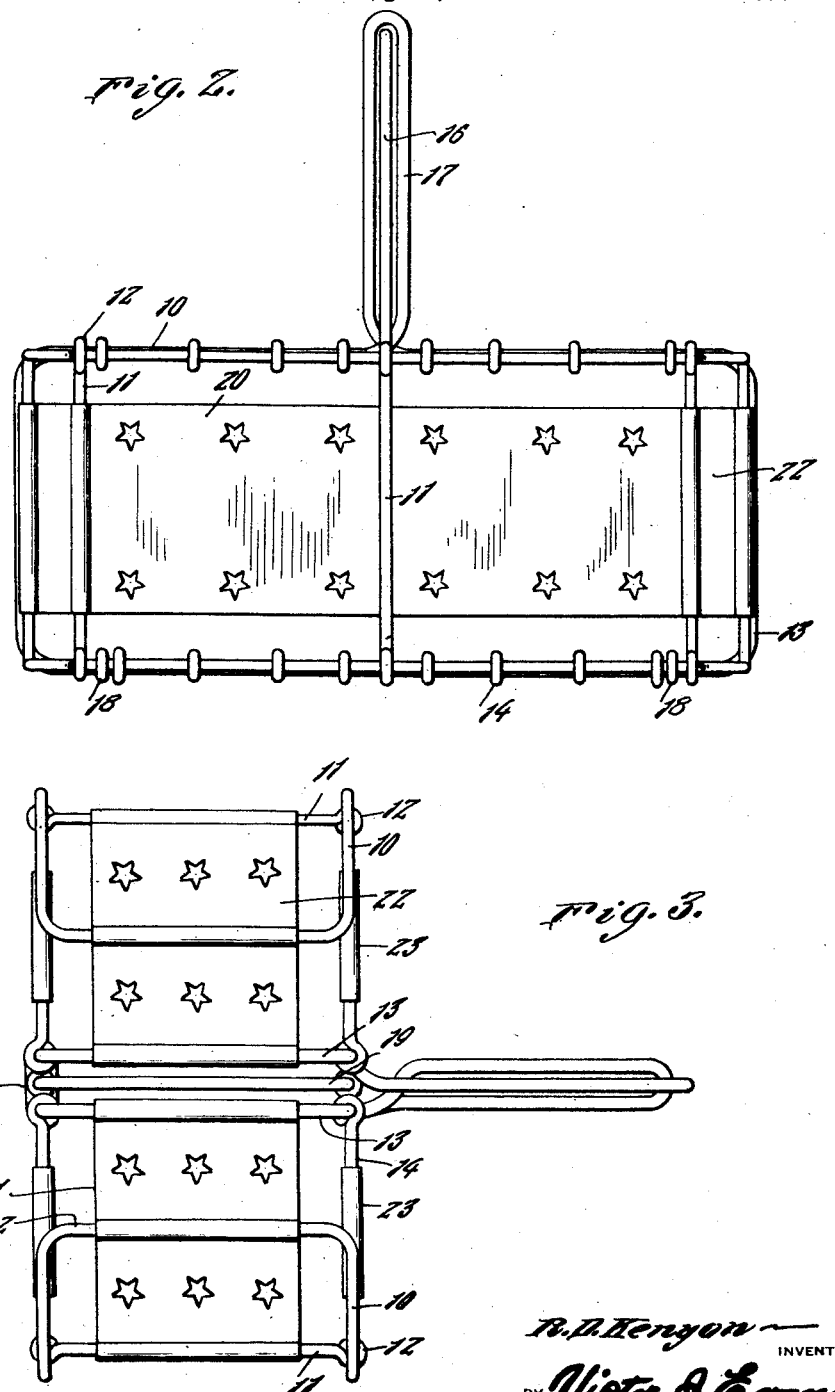

Patented Sept. 4, 1928.

1,683,554

UNITED STATES PATENT OFFICE.

ROLAND D. KENYON, OF CARTHAGE, NEW YORK.

POTATO-BAKING DEVICE.

Application filed August 24, 1927. Serial No. 215,234.

This invention contemplates the provision of a potato baking device, embodying amongst other features, two companion basket-like sections hingedly mounted for movement toward and away from each other so that said sections can be conveniently filled or emptied as the occasion may require, the sections being arranged one above the other for use, and divided by a pivotally mounted partition, so that the device can be reversed when desired.

In carrying out the invention, the companion sections are provided with handles arranged for interlocking association when the sections are arranged one above the other, thereby holding the sections in their proper positions for use.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a front elevation.
Figure 2 is a top plan view.
Figure 3 is an end elevation.
Figure 4 is a view of the partition.
Figure 5 is a detail view of the hinge joint.

Referring to the drawings in detail it will be noted that the device is constructed from wire, and comprises two companion sections which are hingedly connected together, each section being provided with a handle so that the sections can be opened or closed as the occasion may require. Each section comprises a substantially U-shaped wire frame 10, the spaced parallel sides of which are connected by transverse rods 11 which are formed with terminal eyes 12 to surround the parallel portions of the frame as clearly illustrated in Figure 2. Arranged above each section is a frame 13 which is connected with the parallel sides of the U-shaped frame by vertically disposed rods 14, and these rods are also formed with terminal eyes 15 to surround the adjacent portions of the respective frames 10 and 13. Each frame 13 is extended to provide a handle, the handle for one section being indicated at 16 while the handle for the companion section is indicated at 17. These handles are formed to provide loops, so that one handle will fit within the other, and by reason of this inter-association, the handles serve to hold the companion sections in superimposed relation for use. It will be noted upon inspection of Figures 3 and 5 that the handle frames 13 are connected together by links 18 whereby the companion sections are hingedly mounted for movement toward and away from each other, while also supported by said links is a partition 19, the latter being adapted to be positioned between the companion sections of the device, so that the device can be reversed to arrange either section uppermost.

Each section is substantially of basket-like formation and also includes a metal bottom 20 arranged longitudinally along the U-shaped frame, which bottom includes end portions 21 which are arranged vertically and clamped about the upper bar 22 of the U-shaped frame and the adjacent portion of the handle frame 13. This metal bottom extends along the transverse rods 11 which connect the parallel portions of this U-shaped frame and may if desired be slightly bent about these rods to assist in holding the metal bottom in position. Also extending along the sides of each basket-like section is a metallic member 23 which is terminally bent about the adjacent vertical rods 14 which connect each U-shaped frame with the adjacent handle frame.

The sections are swung away from each other to open the device for the purpose of filling the basket-like sections with potatoes, the partition being arranged between the sections but capable of being easily moved from one section to the other while filling the latter. The sections are then moved toward each other into superimposed relation with the partition 19 arranged between the sections so that the device can be reversed to arrange either section uppermost. When the sections are arranged in superimposed relation the handles 16 and 17 are inter-associated in the manner above described and thereby hold the sections against casual separation.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. A potato baking device comprising companion sections, each section including a substantially U-shaped frame, transverse rods connecting the parallel portions of said frame, a handle carrying frame arranged above the U-shaped frame, vertical rods connecting the said parallel portions of the U-shaped frame with said handle carrying frame, a metallic member arranged along the bottom of the U-shaped frame and including end portions secured to the handle carrying frame, metallic strips arranged at the sides of the sections and secured to said vertical rods, links connecting the handle carrying frame of the respective sections, whereby the latter are hingedly mounted and adapted to be arranged in superimposed relation, and said handles being of loop-like formation and arranged to fit one within the other when the sections are superimposed.

2. A potato baking device comprising companion wire basket-like sections hingedly connected together and adapted to be arranged superimposed in communication with each other, each section comprising a substantially U-shaped bottom, the parallel end portions of which terminate short of the top of the basket, a handle carrying frame connected with the top of each section, a partition arranged between the companion sections and mounted for pivotal movement, a flat metallic member secured to each side of each section, and a second flat metallic member extended longitudinally along the bottom and folded about the parallel end portions, and then extended to fold about the handle carrying frame of the particular section.

In testimony whereof I affix my signature.

ROLAND D. KENYON.